United States Patent
Dingman et al.

(10) Patent No.: US 10,590,003 B1
(45) Date of Patent: Mar. 17, 2020

(54) METHOD OF BRIGHTENING GROUND CALCIUM CARBONATE

(71) Applicant: Mississippi Lime Company, St. Louis, MO (US)

(72) Inventors: Sean Dingman, St. Louis, MO (US); Kory Mueller, Ste. Genevieve, MO (US)

(73) Assignee: Mississippi Lime Company, St. Louis, MS (US)

( * ) Notice: Subject to any disclaimer, the term of this patent is extended or adjusted under 35 U.S.C. 154(b) by 50 days.

(21) Appl. No.: 16/111,926

(22) Filed: Aug. 24, 2018

Related U.S. Application Data

(60) Provisional application No. 62/549,745, filed on Aug. 24, 2017.

(51) Int. Cl.
| | | |
|---|---|---|
| *C09C 1/02* | (2006.01) | |
| *C01F 11/18* | (2006.01) | |
| *C01D 13/00* | (2006.01) | |
| *B01J 8/00* | (2006.01) | |
| *B01J 20/04* | (2006.01) | |
| *B01J 20/30* | (2006.01) | |
| *C09C 1/04* | (2006.01) | |

(52) U.S. Cl.
CPC .............. *C01F 11/185* (2013.01); *C09C 1/04* (2013.01); *C01P 2006/60* (2013.01)

(58) Field of Classification Search
None
See application file for complete search history.

(56) References Cited

U.S. PATENT DOCUMENTS

| | | |
|---|---|---|
| 3,589,922 A | 6/1971 | Asdell et al. |
| 3,980,240 A | 9/1976 | Nott |
| 3,990,966 A | 11/1976 | Stanley et al. |
| 4,165,840 A | 8/1979 | Lewis et al. |
| 4,239,736 A | 12/1980 | Fenske |
| 4,824,653 A | 4/1989 | Severinghaus, Jr. et al. |
| 5,188,814 A | 2/1993 | Hellstrom et al. |
| 5,690,897 A | 11/1997 | Drummond |
| 6,270,564 B1 | 8/2001 | Hukkanen |
| 7,105,139 B2 | 9/2006 | Golley |
| 2009/0014695 A1* | 1/2009 | Lynch ..................... C09C 1/021 252/521.5 |

FOREIGN PATENT DOCUMENTS

| | | |
|---|---|---|
| WO | 2000051941 A1 | 9/2000 |
| WO | 2002064505 A1 | 8/2002 |

OTHER PUBLICATIONS

"Persulfate," Wikipedia, https://en.wikipedia.org/wiki/Persulfate, printed on May 15, 2017 (2 pages).

(Continued)

*Primary Examiner* — Daniel Berns
(74) *Attorney, Agent, or Firm* — Lewis Rice LLC

(57) ABSTRACT

A chemical processing method to increase the brightness of a naturally sourced GCC. The process described herein employs a persulfate under certain heating and stirring conditions to effect a brightness change which can be on the order of about 8 points on the GE brightness scale and can move a GCC which is under a GE level of 80 to above a GE level of 80.

12 Claims, 1 Drawing Sheet

(56) References Cited

OTHER PUBLICATIONS

"Ammonium persulfate," Wikipedia, https://en.wikipedia.org/wiki/Ammonium_persulfate, printed on May 15, 2017 (3 pages).
"TAPPI 452 Brightness," IPSTesting website, https://ipstesting.com/find-a-test/tappi-test-methods/tappi-t-452-brightness/, printed on May 15, 2017 (2 pages).

* cited by examiner

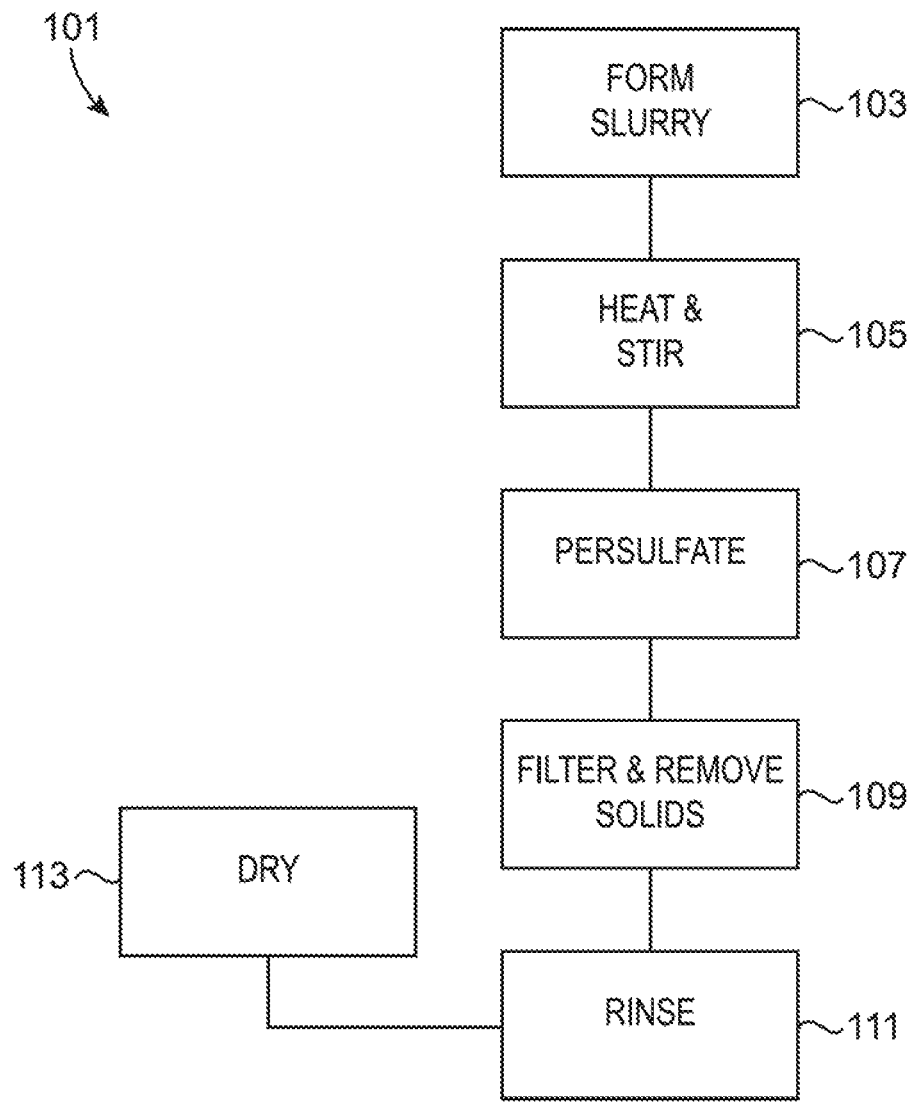

METHOD OF BRIGHTENING GROUND CALCIUM CARBONATE

CROSS REFERENCE TO RELATED APPLICATION(S)

This Application claims the benefit of U.S. Provisional Patent Application Ser. No. 62/549,745, filed Aug. 24, 2017, the entire disclosure of which is herein incorporated by reference.

BACKGROUND

1. Field of the Invention

This disclosure is related to the field of chemical processing, and more particularly to brightening certain compounds such as calcium carbonate.

2. Description of Related Art

Calcium carbonate (limestone or CaCO3), is a naturally occurring substance having a number of industrially useful applications ranging from building materials to road materials to a nutritional calcium source. Ground Calcium Carbonate (GCC) is a natural calcium carbonate mineral that is mined and crushed prior to use. GCC is used in diapers, writing paper, paint, pigments, plastisol and other adhesives, and mineral filler applications. GCC is generally a chalky white substance but there is substantial variation in color and brightness across different GCCs. In particular, variations based on the geographical region and the geological environment from which it is produced are common and expected. While some GCCs are naturally white, others may have an ashen or gray tone or can be colored yellow or pink depending on mineral impurities. Due to the usefulness of GCC as a filler in paints, pigments, and paper, brighter white GCCs are usually more commercially desirable.

The brightness of mineral fillers like GCC can be measured by a number of scales. A commonly used scale in the United States is the TAPPI scale, also sometimes known as the GE scale. This standard was initially developed as a measure of diffuse blue reflectance, primarily for use in pulp bleaching, and was performed by early instruments, such as the General Electric (GE) Photovolt. This early association with GE has led to the industry shorthand "GE brightness" to refer to this measuring technique. GE brightness is generally a measure of the reflectivity of visible light (with a wavelength of about 457 nm) from a substance when observed at a 45° angle.

The Technical Association of the Pulp and Paper Industry (TAPPI) is now the keeper of this standard, and it is sometimes referred to as the TAPPI scale. Various TAPPI standards exist, including T452 and T457. This scale generally uses directional brightness. Because this measure depends on direction, variance in the results can be induced by the measurement angle. Other measures of brightness may be used as well, or instead, of the TAPPI/GE scale. For example, outside of the United States, diffuse brightness measures such as ISO C Brightness (ISO 2970-1, TAPPI T525) or ISO D65 (ISO 2970-2) are generally preferred. GE brightness is just one measure of products brightness or whiteness, and alternate tests include the "Hunter L" and "Hunter Y" scales among other measures. For sake of clarity, the directional brightness technique will be referred to herein as "GE brightness."

GE brightness for GCCs can range substantially, but is typically around 80 on the GE scale. This level of GE brightness is often interpreted as "light grey" in color. However, so-called "high-brightness" GCCs can have a GE brightness often exceeding 90, and GCC from marble sources can have brightness of up to 96. Such brightness values are often related to a truer "white" powder. This means that a typical GCC cannot compete on quality against the higher brightness minerals obtained, for example, from marble sources.

Calcium carbonate may also be manufactured by several methods, frequently from carbonation of a slurry of hydrated lime. The carbonates are called Precipiated Calcium Carbonate (PCC) and typically match brightness levels of high brightness GCCs. However, due to additional steps needed to manufacture PCCs, GCCs generally have a significantly lower cost to produce. There is, therefore, a need in the art to brighten lower-brightness GCCs economically to allow for increased availability of high brightness calcium carbonates at prices suitable for use in industry.

Effective treatment options of GCCs will depend strongly on the type of color body (effectively the impurity) present in the GCC. Typical strategies in mineral processing to improve brightness include chemical treatment, flotation and magnetic separation. However, color bodies generally have not been well characterized in GCCs. Color inducing impurities in natural calcite are believed to be from any or all of the following sources in any particular GCC: (1) organics; (2) iron containing bodies (similar to hematite and magnetite); or (3) other d-block element substances (usually oxides of Mn, Cr, Cu, Co, Ni etc. as typical inorganic color bodies).

Chemical treatments for the attempted removal of color bodies from natural calcites have been attempted with limited success and effective de-coloration of limestone has not appeared in traditional chemical treatment literature. In addition, traditional techniques such as the use of bleaching oxidizers like hydrogen peroxide have been found to be ineffective because an acidic (pH<7) environment is required for effective oxidation. For example, peroxide bleaching of organic color bodies has been found to be very effective at a pH<4 but such acidic environments are detrimental to calcium carbonates as calcium carbonates react with acids to release carbon dioxide ($CO_2$) which destroys the mineral. Other de-coloration strategies have achieved only modest improvement of 1-3 points on the GE brightness scale. These techniques typically focus on flotation, chemical treatment, or magnetic removal.

SUMMARY

Because of these and other problems in the art, described herein, among other things, is a unique chemical processing method to increase the brightness of a naturally sourced GCC. The process described herein employs a persulfate along with heating and mixing conditions to effect a brightness change of about 8 points on the GE brightness scale and can move a GCC which is under a GE level of 80 to above a GE level of 80 or from light grey to white.

There is described herein among other things, a method of brightening calcium carbonate, the method comprising: providing an initial calcium carbonate solid with GE brightness of less than 80; mixing the calcium carbonate with a base and deionized water of about 1 to 3 by weight to produce a basic (pH>7) slurry; heating the basic slurry to a temperature of between 60° C. and about 85° C.; adding a persulfate to the slurry to form an intermediate slurry; agitating the intermediate slurry; filtering the intermediate slurry to collect an initial solid; diluting the initial solid with water and agitate to create a wash; filtering the wash and collect a final calcium carbonate solid; and drying the final calcium carbonate solid; wherein, the final calcium carbonate solid has a GE brightness of greater than 80.

In an embodiment of the method, the initial calcium carbonate is a ground calcium carbonate (GCC).

In an embodiment, the base is a mineral caustic.

In an embodiment of the method, the base is a hydroxide such as one selected from the group consisting of: ammonium, calcium, magnesium, sodium, lithium, or potassium hydroxide.

In an embodiment of the method, the persulfate is selected from the group consisting of: ammonium, potassium, or sodium persulfate.

In an embodiment of the method, the intermediate slurry is agitated for at least 24 hours.

In an embodiment, the method further comprises sparging the intermediate slurry with carbon dioxide ($CO_2$).

In an embodiment of the method, the sparging occurs prior to the intermediate slurry being filtered.

In an embodiment of the method, the final calcium carbonate has a GE brightness of greater than 85.

In an embodiment of the method, the basic slurry has a pH of about 8.5.

In an embodiment of the method, the final calcium carbonate solid is dried at about 110° C.

BRIEF DESCRIPTION OF THE DRAWINGS

FIG. 1 depicts a flowchart of an embodiment of a method to deodorize and brighten ground calcium carbonate according to the present disclosure.

DESCRIPTION OF THE PREFERRED EMBODIMENT(S)

This disclosure is intended to teach by way of example and not by way of limitation.

A general flowchart of an embodiment of a method (101) for increasing Ground Calcium Carbonate GCC brightness is shown in FIG. 1. The depicted embodiment (101) generally utilizes oxidative bleaching using persulfates as an oxidant, but under basic (pH>7) as opposed to acidic (pH<7) conditions. As used herein, the term "persulfate" refers to the ions, or compounds containing the ions, $SO_5^{2-}$ or $S_2O_8^{2-}$. For example, ammonium persulfate is the inorganic compound having the chemical formula $(NH_4)_2S_2O_8$ and is suitable for use in an embodiment of the systems and methods discussed herein.

In the depicted embodiment (101), GCC with a GE brightness of less than 80 is weighed into a mixing vessel along with base which is commonly a hydroxide or combination of hydroxides such as, but not limited to, calcium, sodium, potassium, ammonium, magnesium and/or lithium hydroxide and deionized water aeration of about 1 to 3 by weight to produce a basic (pH>7) slurry (103). Once formed the resultant water and GCC slurry (103) is exposed to a heat source and allowed to warm to and equilibrate at a temperature of between about 60° C. and about 70° C. preferably over the course of at least an hour an while under continuous or intermittent agitation (105).

Once the slurry (103) has equilibrated at temperature, a persulfate such as, but not limited to, ammonium, potassium, or sodium persulfate, is added to the slurry (103) and the resultant mixture is agitated for an amount of time to provide through mixing and exposure. In an embodiment, the agitation is generally at least 24 hours (107). After completion of the agitation step (107), the mixture is filtered and the solid collected (109) from the filter. In an embodiment, the GCC may also be sparged with $CO_2$ to remove calcium hydroxide which may still be present in the material prior to filtration. The solid is then generally transferred to a new vessel, diluted with water, and allowed to stir an additional short period of less than 1 hour to wash the material of water-soluble salts (111). The resulting mixture is then generally filtered again, the solid is collected, and it is dried in an oven at about 110° C. overnight (113) to remove residual water.

The systems and methods of the present application are further illustrated by the following examples:

Example 1

In a first iteration of the method, 60 g of GCC (1 eq.), 16.67 g of calcium hydroxide (0.63 eq.), 180 g of water, and 20.54 g of ammonium persulfate (0.25 eq.) were utilized at 65° C. for 24 hours. To remove calcium hydroxide, the solution was sparged with $CO_2$ gas until a pH of 8.5 was observed prior to filtration and washing. The GE brightness of the resulting GCC increased from a 77 to an 85.

Example 2

In another iteration of the method, 60 g of GCC (1 eq.), 18.00 g of sodium hydroxide (1.25 eq.), 180 g of water, and 20.54 g of ammonium persulfate (0.25 eq.) were utilized at 65° C. for 24 hours. The GE brightness of the resulting GCC increased from a 77 to an 83. Allowing the reaction to proceed for 96 hours resulted in an increase of the GE brightness of the GCC from 77 to 84 showing only a slight improvement over the 24-hour trials.

Example 3

In yet another iteration of the method, 60 g of GCC (I eq.) 4.5 g of sodium hydroxide (0.31 eq.), 180 g of water, and 5.13 g of ammonium persulfate (0.063 eq.) were utilized at 65° C. for 24 hours. The GE brightness of the resulting GCC increased from a 77 to an 82.

Example 4

To act as a control, an experiment was performed under the aforementioned experimental conditions in the absence of persulfate. In this trial, 60 g of GCC (1 eq.), 18.00 g of sodium hydroxide (1.25 eq.), 180 g of water were utilized at 65° C. for 24 hours in the absence of persulfate. The GE brightness of the resulting GCC was observed to decrease from a 77 to a 76. Under the same conditions in the presence of 20.54 g of ammonium persulfate (0.25 eq.), the GE brightness of the resulting GCC increased from a 77 to an 85. To investigate the influence of the base, a control trial was performed where no base was added to the reaction. In this iteration, 60 g of GCC (1 eq.), 180 g of water, and 20.54 g of ammonium persulfate (0.25 eq.) were utilized at 65° C. for 24 hours. The GE brightness of the resulting GCC increased from a 77 to an 81. Under the same conditions in the presence of 18.00 g of sodium hydroxide (1.25 eq.), the GE brightness of the resulting GCC increased from a 77 to an 83.

Based on the above examples, a GCC with a GE brightness of less than 80 (about 77) which has a light, ash-gray appearance, can be whitened to a level greater than 80 and around 85, giving an off-white appearance. Thus, in an embodiment, an increase of at least 5 and often around 7-8 on the GE brightness scale can be obtained providing a much whiter material by simply providing 1 part ammonium persulfate to 3 parts GCC (although different ratios can be used in different embodiments to provide different adjustments), adjusting to basic pH conditions (such as by inclusion of calcium or sodium hydroxide) and heating above 65° C. for sufficient time.

While the invention has been disclosed in conjunction with a description of certain embodiments, including those that are currently believed to be the preferred embodiments, the detailed description is intended to be illustrative and should not be understood to limit the scope of the present disclosure. As would be understood by one of ordinary skill in the art, embodiments other than those described in detail herein are encompassed by the present invention. Modifications and variations of the described embodiments may be made without departing from the spirit and scope of the invention.

It will further be understood that any of the ranges, values, properties, or characteristics given for any single component of the present disclosure can be used interchangeably with any ranges, values, properties, or characteristics given for any of the other components of the disclosure, where compatible, to form an embodiment having defined values for each of the components, as given herein throughout. Further, ranges provided for a genus or a category can also be applied to species within the genus or members of the category unless otherwise noted.

The qualifier "generally," and similar qualifiers as used in the present case, would be understood by one of ordinary skill in the art to accommodate recognizable attempts to conform a device to the qualified term, which may nevertheless fall short of doing so. This is because terms such as "sphere" are purely geometric constructs and no real-world component is a true "sphere" in the geometric sense. Variations from geometric and mathematical descriptions are unavoidable due to, among other things, manufacturing tolerances resulting in shape variations, defects and imperfections, non-uniform thermal expansion, and natural wear. Moreover, there exists for every object a level of magnification at which geometric and mathematical descriptors fail due to the nature of matter. One of ordinary skill would thus understand the term "generally" and relationships contemplated herein regardless of the inclusion of such qualifiers to include a range of variations from the literal geometric meaning of the term in view of these and other considerations.

The invention claimed is:

1. A method of brightening calcium carbonate, the method comprising:
   providing an initial calcium carbonate solid with GE brightness of less than 80;
   mixing said calcium carbonate with a base and deionized water of about 1 to 3 by weight to produce a basic (pH>7) slurry;
   heating said basic slurry to a temperature of between 60° C. and about 85° C.;
   adding a persulfate to said slurry to form an intermediate slurry;
   agitating said intermediate slurry;
   filtering said intermediate slurry to collect an initial solid;
   diluting said initial solid with water and agitate to create a wash;
   filtering said wash and collect a final calcium carbonate solid; and
   drying said final calcium carbonate solid;
   wherein, said final calcium carbonate solid has a GE brightness of greater than 80.

2. The method of claim 1, wherein said initial calcium carbonate is a ground calcium carbonate (GCC).

3. The method of claim 1 wherein said base is a mineral caustic.

4. The method of claim 1 wherein the base is a hydroxide.

5. The method of claim 4 wherein said hydroxide is selected from the group consisting of: ammonium, calcium, magnesium, sodium, lithium, or potassium hydroxide.

6. The method of claim 1, wherein said persulfate is selected from the group consisting of: ammonium, potassium, or sodium persulfate.

7. The method of claim 1, wherein said intermediate slurry is agitated for at least 24 hours.

8. The method of claim 1 further comprising sparging said intermediate slurry with carbon dioxide ($CO_2$).

9. The method of claim 8 wherein said sparging occurs prior to said intermediate slurry being filtered.

10. The method of claim 1, wherein said final calcium carbonate has a GE brightness of greater than 85.

11. The method of claim 1, wherein said basic slurry has a pH of about 8.5.

12. The method of claim 1, wherein said final calcium carbonate solid is dried at about 110° C.

* * * * *